INVENTOR
MAURICE. K. TAYLOR

BY Young, Emery & Thompson
ATTORNEYS

July 4, 1950  M. K. TAYLOR  2,513,899
PIEZOELECTRIC MULTIPLYING DEVICE
Filed Feb. 25, 1948  2 Sheets-Sheet 2

INVENTOR
MAURICE K. TAYLOR
BY Young, Emery & Thompson
ATTORNEYS

Patented July 4, 1950

2,513,899

UNITED STATES PATENT OFFICE 2,513,899

PIEZOELECTRIC MULTIPLYING DEVICE

Maurice Kenyon Taylor, Eastlothian, Scotland, assignor to Ferranti Limited, Hollinwood, near Oldham, England, a British company Application February 25, 1948, Serial No. 10,892
In Great Britain February 27, 1947

4 Claims. (Cl. 235—61)

This invention relates to electrical computing instruments of the type for obtaining the product $z$ of the two known quantities $x$ and $y$, in which currents or voltages, which may be either alternating or direct, are derived proportional to the various terms of the computation. These currents or voltages are hereinafter referred to for convenience as for instance "the $x$ currents," "the $x$ voltage" etc. Such electrical computing instruments are hereinafter referred to as being of the type stated.

In a known type of such electrical computing instrument the $x$ and $y$ currents are fed into the fixed and moving coils respectively of a dynamometer movement, the torque derived in which is therefore proportional to the product of these currents. When this torque is balanced by a torque proportional to a third current, e. g. by the torque set up by a second moving coil carrying this current and free to rotate in a fixed field, the third current is proportional to the product of the other two and this represents the solution $z$ of the equation.

In the above and similar known types of computer a second electromagnetic system is required to balance the torque derived from the dynamometer and this renders the computer somewhat bulky. Moreover if the currents fed to the dynamometer coils are alternating (such currents being usually more convenient to deal with) they must be in phase in order to ensure a correct result, thus requiring the provision of means to ensure this.

The object of the present invention is to provide an electrical computing instrument of the type stated in which at least one of the $x$ and $y$ currents is an alternating current and in which the above described disadvantages are avoided.

According to the present invention an electrical computing instrument of the type stated comprises means for deriving an oscillatory mechanical force proportional to the product of the $x$ and $y$ currents, means for applying said force to one end of a piezo-electric crystal the other end of which is rigidly held so that an alternating voltage proportional to said force is developed between two faces of said crystal, and means for deriving the term $z$ from the value of said voltage or for applying said voltage to a further computer stage.

Figure 1:
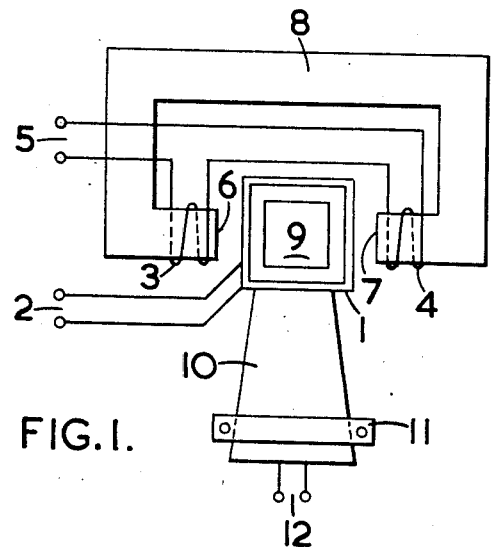
Figure 1 is a diagram illustrating one embodiment of the invention.

In carrying out the invention according to one form by way of example, see Figure 1, an electrical computing instrument of the type stated comprises a dynamometer movement in which a moving coil 1 connected to terminals 2 is adapted to vibrate to a limited extent about a diametrical axis in and normal to the field set up by two fixed coils 3, 4 connected in series to terminals 5 and wound on the poles 6, 7 of a ferromagnetic field system 8.

The length of the air gap is reduced by a bridge piece 9 of ferromagnetic material placed within coil 1 and secured relative to the main magnetic system 8. Alternatively, the bridge piece may be secured to the moving coil and move with it, though of course this addition to the mass and hence inertia of the moving member comprising the moving coil and coil-supporting structure results in a lower value of the resonant frequency of vibration. Moving coil 1 is secured to one end of a piezo-electric crystal 10 responsive to torsion, the other end of which is held against movement by a clamp 11. Electrical connections are made from the electrodes of the crystal to terminals 12.

In operation, alternating $x$ and $y$ currents of the same frequency are fed to the fixed and moving coils through terminals 5 and 2 respectively. The oscillatory mechanical force thus set up makes moving coil 1 vibrate about a diametrical axis normal to the field and thus applies a corresponding oscillatory torque to the free end of crystal 10 which in turn sets up an alternating voltage proportional to the torque, across the faces of crystal 10 connected to terminals 12. The instrument may be calibrated so that the term $z$ may be readily obtained from this voltage or the voltage may be applied to a further computer stage.

Figure 4:
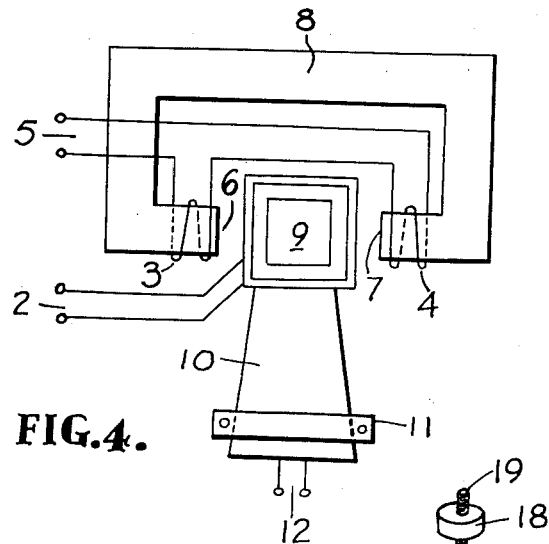
Fig. 4 is a view similar to Fig. 1 showing a modification.

In another embodiment of the invention as shown in Fig. 4 a fixed and moving coil system is used as before but the polarity of one fixed coil is reversed so that on energizing the moving coil instead of vibrating about a diametrical axis vibrates bodily without twisting in the field set up by the fixed coils. A corresponding oscillatory force is thus applied to the free end of a bender crystal the other end of which is clamped.

Figure 2:
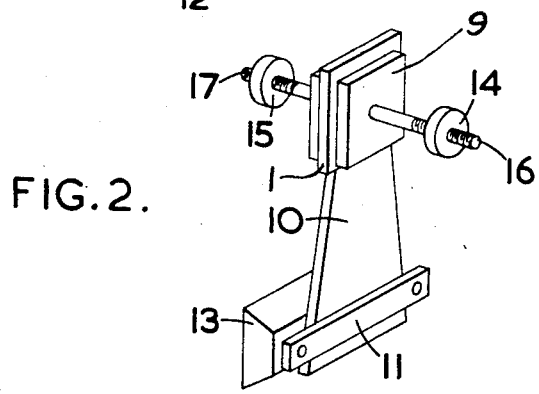
Figure 2 is a perspective drawing of part of that embodiment of the invention illustrated by Figure 1.
Figure 5:
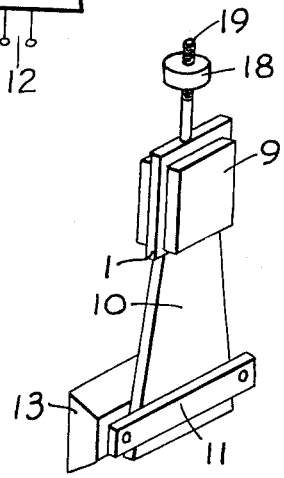
Fig. 5 is a view similar to Fig. 2 showing a further modification.

The resonant frequency of vibration of the moving member may be adjusted in the first of the above embodiments by a simple system of balance weights. This is illustrated in Figure 2, which shows a coil and crystal mounting arrangement for use with the embodiment illustrated by Figure 1, similar parts being similarly referenced; coil 1 is however now shown wound on the bridge piece 9, which thus acts as the coil-supporting structure and so forms an integral part of the moving member. The crystal is clamped by clamp 11 to a base member 13. The connections to terminals 2 and 12 are omitted for clarity. Two balance weights 14, 15 are provided; these may be moved by rotation along screwed rods 16, 17 respectively, projecting from the bridge piece 9 part of the moving member at right angles to the torsion axis. In the case of the second embodiment this adjustment may be effected by a weight 18 (Fig. 5) capable of being moved along screwed rod 19 coaxial with the central axis of the crystal and coil combination. In this case, of course, weights 14, 15 with their screwed rods are omitted.

Figure 3:
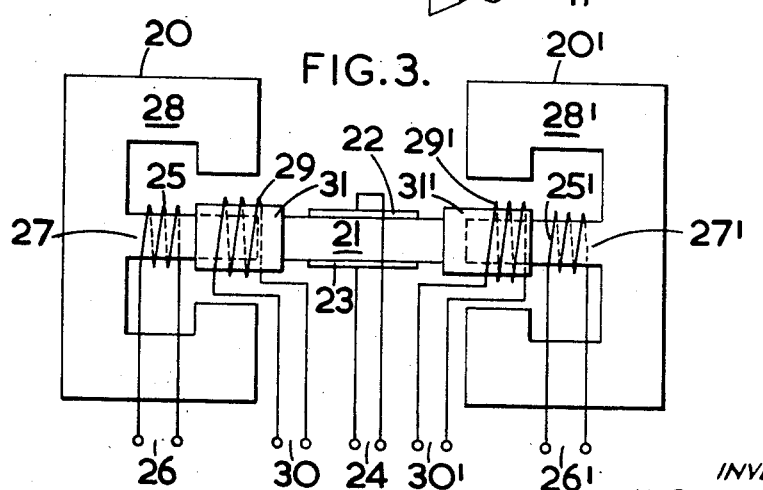
Figure 3 is a diagram illustrating a further embodiment of the invention.

A third embodiment of the invention, see Figure 3, uses two electromagnetic systems 20, 20¹ each of which is similar to that of a moving coil loudspeaker energized by a fixed coil, in the radial field set up by which a moving coil may vibrate bodily without twisting, as in the second of the above described embodiments. The two systems face each other and between them is located a crystal 21 that is responsive to varying compressive stress; connections are made from electrodes 22, 23 to terminals 24. The crystal is supported at its centre by means not shown and is thus in effect equivalent to two crystals electrically connected in parallel and each rigidly held at an end, the two held ends being placed "back to back" at the position occupied by the centre of the combined crystal. Electromagnetic system 20 has a fixed coil 25 (connected to terminals 26) wound on the centre limb 27 of ferromagnetic field system 28. Moving coil 29 (connected to terminals 30) is wound on an aluminium former 31 (having slots, not shown, to avoid eddy current losses) secured to one end of crystal 21 and fitting closely but freely over centre limb 27. Electromagnetic system 20¹ is arranged in the same manner; corresponding parts are accordingly given the same reference numbers primed. An alternating $x$ current is fed to fixed coils 25, 25¹ in series or parallel by way of terminals 26, 26' and an alternating $y$ current to the moving coils 29, 29' in series or parallel by way of terminals 30, 30¹. In operation, the coils are so connected that the forces set up by these currents subject the crystal to an alternating compressive stress proportional to the products of the currents and an output voltage proportional to this product is thus set up across the lateral faces of the crystal and is available at terminals 24. In a similar arrangement a crystal may be subjected to alternating tensional stress, or alternate tension and compression. In a further arrangement of this embodiment currents proportional to quantities $p$ and $q$ of a computation are fed to the fixed and moving coils respectively of one electromagnetic system whilst currents proportional to quantities $r$ and $s$ of the computation are fed to the other coils. The crystal output is in this case proportional to $pq+rs$ according to the relative polarities.

The output from the above-described embodiments is not affected by any phase difference there may be between the alternating $x$ and $y$ currents. Suppose these currents are represented by the general expression $A \sin \omega t$ and $B \sin (\omega t + \phi)$ where A and B are the respective amplitudes, the periodicity of a common source of supply, $t$ the time from the same given moment, and $\phi$ the phase difference between the currents. The resulting force is of the form $$\frac{AB}{2} \cos \phi - \frac{AB}{2} \cos (2\omega t + \phi)$$

This form is familiar in the theoretical study of wattmeters and other instruments of the dynamometer type, which are usually designed to respond to the first part of the expression but not to the second. It will be observed that the first part, $(AB/2) \cos \phi$, is affected by the phase difference between $x$ and $y$ currents. In electrical computing instruments of the type stated as hitherto known this phase difference is undesired, since if it is not allowed for it may cause incorrect operation, but is however not easily eliminated. In instruments according to the invention the force applied to the crystal is proportional to the whole of the expression $(AB/2) \cos \phi - (AB/2) \cos (2\omega t + \phi)$ but as the first part, $(AB/2) \cos \phi$, merely represents a comparatively fixed distortion of the crystal the A. C. output from the crystal is unaffected by it, being represented by the waveform $(-AB/2) \cos (2\omega t + \phi)$ the amplitude of which varies only with A or B. The A. C. output of instruments in accordance with the invention is thus unaffected by the phase difference between the currents in the dynamometer section of the computer. An important additional advantage is that as the output periodicity is constant at $2\omega$, the value of which is usually known, the moving member of the computer may be made resonant to this value, as described above, and thus develop an increased output.

In any of the embodiments one of the two currents may be a direct current so long as the other is an alternating current; the output voltage is then proportional to the product of the D. C. and A. C. values of the respective currents.

It will readily be appreciated that the use of a crystal enables a considerable saving of bulk to be effected. Moreover the fact that the moving coil is attached to a crystal instead of being pivoted on bearings affords a form of construction which is simple and rigid and which does not necessitate the use of ligaments.

A special case of a computer of the type stated is a modulator, from which, as is well known, an output is derived that is proportional to the product of the carrier and signal inputs. Any of the above-described embodiments may be used as an efficient modulator.

If resonance of the moving part of the system is not required, for example, if it is desired to use a wide band of frequencies, the entire instrument may be immersed in oil so that resonance is damped. This arrangement has the additional advantage that the resultant cooling of the coils allows a considerable increase in the input wattage.

The above-described embodiments are for illustration only and by no means exhaust the scope of the invention. In this connection it should be understood that the term "computer" should be construed in a wide sense to include all means whereby an output voltage proportional to the product of two input currents is obtained.

I claim:

1. An electrical computing instrument of the type for obtaining the product $z$ of two known quantities $x$ and $y$ comprising means for supplying two electrical currents proportional to the quantities $x$ and $y$ respectively, means for deriving an oscillatory mechanical force proportional to the products of the $x$ and $y$ currents, a piezo-electric crystal, means rigidly holding one end of said crystal, a mechanical connection for applying said mechanical force to the other end of said crystal so that an alternating voltage proportional to said force is developed between two faces of said crystal, and means for deriving the term $z$ from the value of said alternating voltage.

2. An electrical computing instrument of the type for obtaining the product $z$ of two known quantities $x$ and $y$ comprising means for supplying two electrical currents proportional to the quantities $x$ and $y$ respectively, means for deriving an oscillatory mechanical force proportional to the products of the $x$ and $y$ currents, including a dynamometer movement having fixed and moving coils whose axes are at approximately right angles to each other and means for feeding the $x$ current to one of said coils and the $y$ current to the other of said coils so that in operation said force causes said moving coil to vibrate about a diametrical axis thereof in the field set up by said fixed coil and normal to said field, a piezo-electric crystal, means rigidly holding one end of said crystal, a mechanical connection for applying said mechanical force to the other end of said crystal so that an alternating voltage proportional to said force is developed between two faces of said crystal, and means for deriving the term $z$ from the value of said alternating voltage.

3. An electrical computing instrument of the type for obtaining the product $z$ of two known quantities $x$ and $y$ comprising means for supplying two electrical currents proportional to the quantities $x$ and $y$ respectively, means for deriving an oscillatory mechanical force proportional to the product of the $x$ and $y$ currents, including fixed and moving coaxial coils and means for feeding the $x$ current to one of said coils and the $y$ current to the other of said coils so that in operation said force causes said moving coil to vibrate bodily without twisting in the field set up by said fixed coil, a piezo-electric crystal, means rigidly holding one end of said crystal, a mechanical connection for applying said mechanical force to the other end of said crystal so that an alternating voltage proportional to said force is developed between two faces of said crystal, and means for deriving the term $z$ from the value of said alternating voltage.

4. An electrical computing instrument of the type for obtaining the product $z$ of two known quantities $x$ and $y$ comprising means for supplying two electrical currents proportional to the quantities $x$ and $y$ respectively, means for deriving an oscillatory mechanical force proportional to the product of the $x$ and $y$ currents, including fixed and moving coils and means for feeding the $x$ current to one of said coils and the $y$ current to the other of said coils so that in operation said force causes said moving coil to vibrate bodily without twisting in the field set up by said fixed coil, a piezo-electric crystal, means rigidly holding one end of said crystal, a mechanical connection for applying said mechanical force to the other end of said crystal so that an alternating voltage proportional to said force is developed between two faces of said crystal, and means for deriving the term $z$ from the value of said alternating voltage.

MAURICE KENYON TAYLOR.

REFERENCES CITED

The following references are of record in the file of this patent:

UNITED STATES PATENTS

| Number | Name | Date |
|---|---|---|
| 2,289,183 | Ehret | July 7, 1942 |
| 2,401,527 | Vance | June 4, 1946 |